Jan. 14, 1969 N. N. BUCHSBAUM 3,421,983
AZEOTROPIC DISTILLATION OF AQUEOUS TOLUENE DIAMINE
Filed March 7, 1967

INVENTOR.
Norbert N. Buchsbaum
BY
*Marn & Jangarathis*
ATTORNEYS

United States Patent Office 3,421,983
Patented Jan. 14, 1969

3,421,983
AZEOTROPIC DISTILLATION OF AQUEOUS TOLUENE DIAMINE
Norbert N. Buchsbaum, Clifton, N.J., assignor to The Lummus Company, New York, N.Y., a corporation of Delaware
Filed Mar. 7, 1967, Ser. No. 621,282
U.S. Cl. 203—14    5 Claims
Int. Cl. C07c 87/50; B01d 3/36

ABSTRACT OF THE DISCLOSURE

A method for removing water from a crude reactor effluent containing toluene diamine wherein monochlorobenzene is admitted with the crude reactor effluent to permit azeotropic distillation of the water.

This invention relates to a novel method for removing water from a reactor effluent containing toluene diamine. More specifically, it is directed to the removal of water from a reactor effluent containing toluene diamine, utilizing monochlorobenzene to effect an azeotropic distillation.

Toluene diisocyanate is generally produced from toluene diamine which is formed by hydrogenating dinitrotoluene. The hydrogenation of dinitrotoluene is accompanied by the formation of water. It is desirable to phosgenate substantially anhydrous toluene diamine and accordingly, it is desirable to separate water from the toluene diamine prior to the phosgenation reaction. Toluene diamine is normally dried using distillation techniques; however, toluene diamine is heat sensitive and subject to thermal degradation. Consequently, from 2 to 4% of the toluene diamine is decomposed during distillation as a result of the high operating temperatures notwithstanding effecting the separation under a vacuum.

It is an object of this invention to provide a novel method for the separation of water from toluene diamine to obtain substantially anhydrous toluene diamine.

Another object of this invention is to provide a novel method for separating water from toluene diamine utilizing azeotropic distillation techniques with a concurrent increase in product yield.

A further object of this invention is to provide a novel method for separating water from toluene diamine utilizing azeotropic distillation techniques wherein thermal degradation of the toluene diamine is essentially eliminated.

Other aspects, objects and additional advantages of the present invention will become apparent from the following description thereof, taken with the accompanying drawings, in which.

According to the present invention, toluene diamine is admixed with monochlorobenzene and introduced into a distillation zone to effect an azeotropic distillation. An azeotropic mixture of monochlorobenzene and water is withdrawn as overhead from the tower and a mixture of toluene diamine and monochlorobenzene is withdrawn as tower bottoms. This mixture can be directly phosgenated to give toluene diisocyanate. The distillation tower is operated at a bottom temperature as low as 310° F. which corresponds to essentially atmospheric pressure. Under such conditions, thermal degradation of the toluene diamine is essentially negligible.

Figure 1:
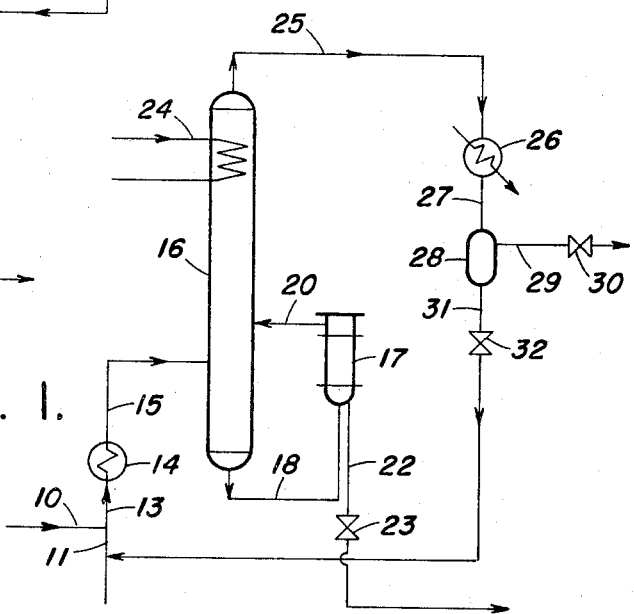
FIGURE 1 is a schematic flow diagram of one embodiment of the invention, illustrating one method of introducing the azeotropic agent into the distillation tower.

Referring now to FIGURE 1, crude toluene diamine in line 10 and monochlorobenzene in line 11 are admixed in line 13 and passed through heat exchanger 14 to preheat the combined stream. The combined stream is thereafter passed through line 15 to a fractionating column 16. Heat is supplied to the fractionating column 16 by a suitable reboiler means 17. The latter provides for the circulation and heating of the bottoms material in the fractionating column externally of the column; the bottoms product being withdrawn from the lower end of column 16 by way of line 18 and passed through reboiler 17. Heated bottoms is discharged from the upper end of reboiler 17 by way of line 20 and is returned to the lower portion of the fractionating column. A portion of the bottoms product may be continuously or intermittently withdrawn from the lower end of the column and the reboiler 17 by way of line 22 and valve 23.

In the upper portion of the fractionating column 16 there is shown a reflux condensing coil 24. The condenser coil 24 provides for the formation of internal reflux at the top portion of the fractionating column 16. The distillate vapor from the upper portion of the fractionating column 16 is withdrawn by way of line 25 to condenser 26, wherein the distillate vapor is condensed to liquid state.

The distillate forms two insoluble layers which are passed through line 27 to decanter 28, where water, the light layer, is withdrawn through line 29 and valve 30 and discarded as waste. The heavy layer, monochlorobenzene, is withdrawn from the decanter through line 31 and valve 32 and is totally recycled to the fractionating column after admixture with crude toluene diamine and preheating.

Figure 2:
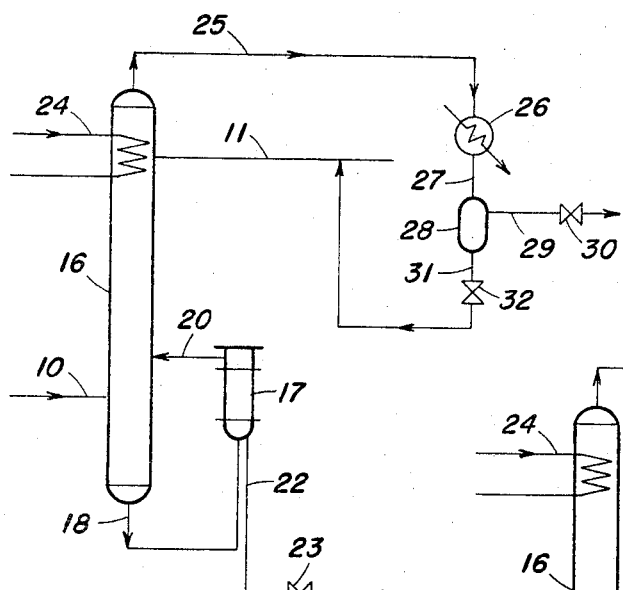
FIGURE 2 is a schematic flow diagram of another embodiment of the invention for introducing the azeotropic agent to the distillation tower.

Referring now to FIGURE 2, crude toluene diamine passes through line 10 directly to fractionating column 16. The crude toluene diamine is not preheated and enters the fractionating column as liquid. Liquid monochlorobenzene is introduced into the fractionating column from line 11 at the area of reflux. The apparatus is otherwise similar to the apparatus shown in FIGURE 1.

Figure 3:
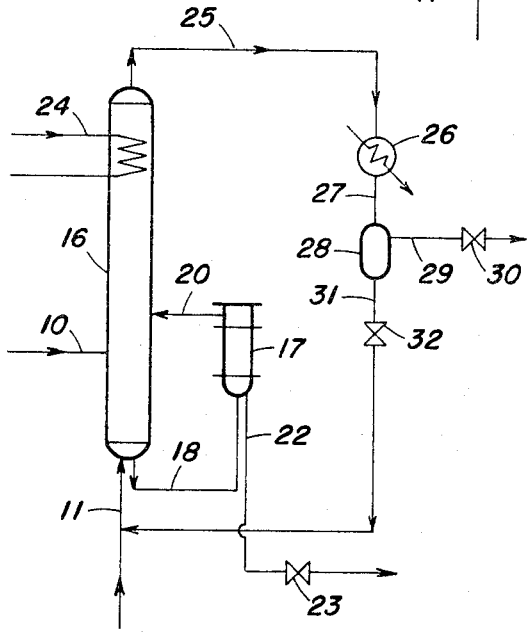
FIGURE 3 is a schematic flow diagram of still another embodiment of the invention for introducing the azeotropic agent into the distillation tower.

Referring now to FIGURE 3, the apparatus is similar to the apparatus shown in FIGURE 2, except that the monochlorobenzene in line 11 is added as a liquid feed directly to the bottoms stream recirculating through the reboiler.

The process of the invention will be further described and illustrated by the following example. However, although this example may describe certain preferred features of the invention, it is understood that it is for illustrative purposes and that modification and substitutions of equavilents may be resorted to within the scope of the appended claims.

Referring to FIGURE 1, crude toluene diamine in line 10 and monochlorobenzene in line 11 are admixed in line 13 in the ratio of 40% toluene diamine and 60% monochlorobenzene and passed through heat exchanger 14, where the mixture is heated to a temperature of 225° F. at a pressure of 800 mm. Hg, and thereafter is passed through line 15 to fractionating column 16.

The bottoms product in the lower portion of the column is maintained at a temperature of 310° F. at a pressure of 815 mm. Hg. Water is stripped from the feed mixture and a mixture of water vapor and monochlorobenzene vapor, having a composition closely approaching azeotropic composition, is refluxed at the top of the column which is maintained at a temperature of 196° F. and 770 mm. Hg.

The distillate vapor is withdrawn by way of line 25 to condenser 26, wherein the distillate vapor is condensed and two insoluble layers form. The two liquids are passed to decanter 28 and the top layer, water, is withdrawn and discarded. The bottom layer, monochlorobenzene, is recycled to the fractionating column.

Make-up monochlorobenzene is supplied through line 11, so as to maintain a tower bottoms composition of 40% toluene and 60% monochlorobenzene.

The quantity of monochlorobenzene added to the system is set by the toluene diamine-monochlorobenzene composition that is to be maintained as the tower bottoms. The 40% toluene diamine, 60% monochlorobenzene bottoms composition illustrated permits distillation at atmospheric pressure at the relatively low temperature of about 310° F.; but, other compositions can be selected, generally ranging from about 25 to 400%, and more preferably about 100 to 200% by weight, monochlorobenzene based on the weight of toluene diamine in the mixture. Toluene diamine should not be in too dilute a solution in monochlorobenzene, since the monochlorobenzene in the bottoms product would still contain minute quantities of dissolved water. If there were a considerable excess of monochlorobenzene to toluene diamine, the residual ratio of water to toluene diamine would be unsuitably high for toluene diisocyanate production. In the preferred embodiment of the present invention, the bottoms product contains only a small percentage of monochlorobenzene in toluene diamine, thus, considerably reducing the ratio of residual water to toluene diamine and making it suitable for toluene diisocyanate production.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A process for recovering substantially anhydrous toluene diamine from water contaminated toluene diamine, which comprises:
   (a) introducing the water contaminated toluene diamine and monochlorobenzene into a distillation zone operated at about atmospheric pressure at a temperature whereby the bottoms product comprises a solution of toluene diamine in monochlorobenzene having a weight ratio of between about 1:1 and about 2:1 of monochlorobenzene to toluene diamine;
   (b) azeotropically distilling within said distillation zone;
   (c) withdrawing substantially anhydrous toluene diamine in monochlorobenzene as bottoms from said zone;
   (d) withdrawing monochlorobenzene and water vapor azeotrope from said zone as overhead;
   (e) condensing said overhead whereby two insoluble layers form;
   (f) separating said monocholorobenzene; and
   (g) recycling said monochlorobenzene from step (f) to step (a).

2. A process as defined in claim 1 wherein said toluene diamine and monochlorobenzene are mixed, heated and introduced as a hot liquid into the distillation zone.

3. A process as defined in claim 1 wherein said monochlorobenzene is introduced into the reflux portion of said distillation zone.

4. A process as defined in claim 1 wherein said monochlorobenzene is introduced into the bottoms portion of said distillation zone.

5. A process as defined in claim 1 wherein the overhead temperature of the distillation zone is about 196° F., the bottoms temperature is about 310° F. and the monochlorobenzene to toluene diamine weight ratio in the bottoms is about 1.5:1.

References Cited

UNITED STATES PATENTS

| | | | |
|---|---|---|---|
| 2,187,820 | 1/1940 | Lecher et al. | 203—67 |
| 2,385,504 | 9/1945 | Goulding | 260—582 |
| 2,517,276 | 8/1950 | Bassford et al. | 203—67 |
| 3,317,606 | 5/1967 | Luberoff et al. | 260—582 |

OTHER REFERENCES

Transactions of American Institute of Chemical Engineers: Extractive and Azeotropic Distillation, M. Benedict et al., pp. 366–370, June 1945.

Technique of Organic Chemistry: vol. IV, Distillation Interscience Publ. Inc., New York, Weissberger, 1951 and 1965, pp. 497–499.

Distillation: Hengstebeck, 1961, New York, pp. 25 and 26.

WILBUR L. BASCOMB, Jr., *Primary Examiner.*

U.S. Cl. X.R.

203—67, 98; 260—582